(12) United States Patent
Taguchi et al.

(10) Patent No.: US 11,565,840 B2
(45) Date of Patent: Jan. 31, 2023

(54) BINDING MACHINE

(71) Applicant: MAX CO., LTD., Tokyo (JP)

(72) Inventors: Satoshi Taguchi, Tokyo (JP); Kenji Kobayashi, Tokyo (JP)

(73) Assignee: MAX CO., LTD., Tokyo (JP)

(*) Notice: Subject to any disclaimer, the term of this patent is extended or adjusted under 35 U.S.C. 154(b) by 148 days.

(21) Appl. No.: 16/997,017

(22) Filed: Aug. 19, 2020

(65) Prior Publication Data

US 2021/0053709 A1 Feb. 25, 2021

(30) Foreign Application Priority Data

Aug. 23, 2019 (JP) .............................. JP2019-153228
Mar. 25, 2020 (JP) .............................. JP2020-055104

(51) Int. Cl.
*B65B 13/34* (2006.01)
*B65B 27/10* (2006.01)
*B25C 5/02* (2006.01)
*A01G 17/08* (2006.01)

(52) U.S. Cl.
CPC ............ *B65B 13/345* (2013.01); *B65B 27/10* (2013.01)

(58) Field of Classification Search
CPC ..... B65B 13/345; B65B 13/185; B65B 13/16; B65B 27/10; B25C 5/0207; B25C 5/0292; A01G 17/08
USPC ................................. 140/93, 93.2, 93.4, 93.6
See application file for complete search history.

(56) References Cited

U.S. PATENT DOCUMENTS

| 2,920,324 A | 1/1960 | Kurfel, Jr. et al. |
| 5,915,425 A * | 6/1999 | Nilsson ................. B65B 13/027 140/93.2 |
| 2005/0028497 A1* | 2/2005 | Hayashi ............... A01G 17/085 53/592 |
| 2007/0023474 A1* | 2/2007 | Smith ................... B25C 5/0207 227/154 |
| 2015/0181810 A1* | 7/2015 | Cho ....................... A01G 17/08 227/120 |
| 2017/0361958 A1* | 12/2017 | Hayashi ................ A01G 17/08 |

FOREIGN PATENT DOCUMENTS

JP 2017-222403 A 12/2017

OTHER PUBLICATIONS

The Extended European Search Report for European Application No. 20191980.0-1011, dated Jan. 20, 2021, (10 pages).

* cited by examiner

*Primary Examiner* — Adam J Eiseman
*Assistant Examiner* — Mohammed S. Alawadi
(74) *Attorney, Agent, or Firm* — Weihrouch IP

(57) ABSTRACT

A binding machine includes: a main handle configured to accommodate a staple; a staple driver supported by the main handle and configured to drive the staple; and a clincher arm rotatably attached to the main handle and including a clincher, the clincher being configured to clinch the staple driven by the staple driver. The staple driver includes: a driving portion that extends in a direction away from the main handle and is configured to drive the staple toward the clincher, and an attachment portion with which the driving portion is attached to the main handle, and the attachment portion extends in a longitudinal direction of the main handle from a side edge of the driving portion.

20 Claims, 17 Drawing Sheets

US 11,565,840 B2

BINDING MACHINE

CROSS REFERENCE TO RELATED APPLICATIONS

This application claims priority to Japanese Patent Application No. 2019-153228 filed on Aug. 23, 2019 and Japanese Patent Application No. 2020-055104 field on Mar. 25, 2020, the contents of which are incorporated herein by reference.

TECHNICAL FIELD

The present invention relates to a binding machine.

BACKGROUND ART

A binding machine for gardening has been used for binding work during cultivating of agricultural crops. For example, in cultivating of agricultural crops such as cucumbers, grapes, tomatoes, pears, and plums, a binding machine for gardening has been used in order to bind vines and stems of plants to struts and nets. The binding machine includes a staple driver which drives one staple each time.

JP2017-222403A discloses a binding machine for gardening capable of preventing a dimensional change of an ejection port of a staple magazine. FIG. 4 of JP2017-222403A shows a plate-shaped driver 78 for driving staples. The staple driver 78 includes a mechanical coupling portion (a portion attached to the binding machine) supported by a tape holder 44 laid along a longitudinal direction of a binding machine body 40 and a driving portion that is bent from the mechanical coupling portion and extends toward a staple magazine unit 60, so as to form an L shape.

However, in the case of a binding machine that performs binding using the binding tape, a load associated with an operation of causing the staple to pass through the binding tape and sewing the binding tape is extremely small. Therefore, a force that acts on the staple driver from a clincher when the operator grips the operation handle is a load to be applied to the bent portion of the staple driver. Therefore, the bent portion of the staple driver may be damaged.

SUMMARY OF INVENTION

Embodiments of the present invention provide a binding machine including a highly durable staple driver that is less likely to be damaged even when being used repeatedly.

According to an aspect of the present invention, a binding machine includes: a main handle configured to accommodate a staple; a staple driver supported by the main handle and configured to drive the staple; and a clincher arm rotatably attached to the main handle and including a clincher, the clincher being configured to clinch the staple driven by the staple driver. The staple driver includes: a driving portion that extends in a direction away from the main handle and is configured to drive the staple toward the clincher, and an attachment portion with which the driving portion is attached to the main handle. The attachment portion extends in a longitudinal direction of the main handle from a side edge of the driving portion.

DESCRIPTION OF EMBODIMENTS

Figure 1:
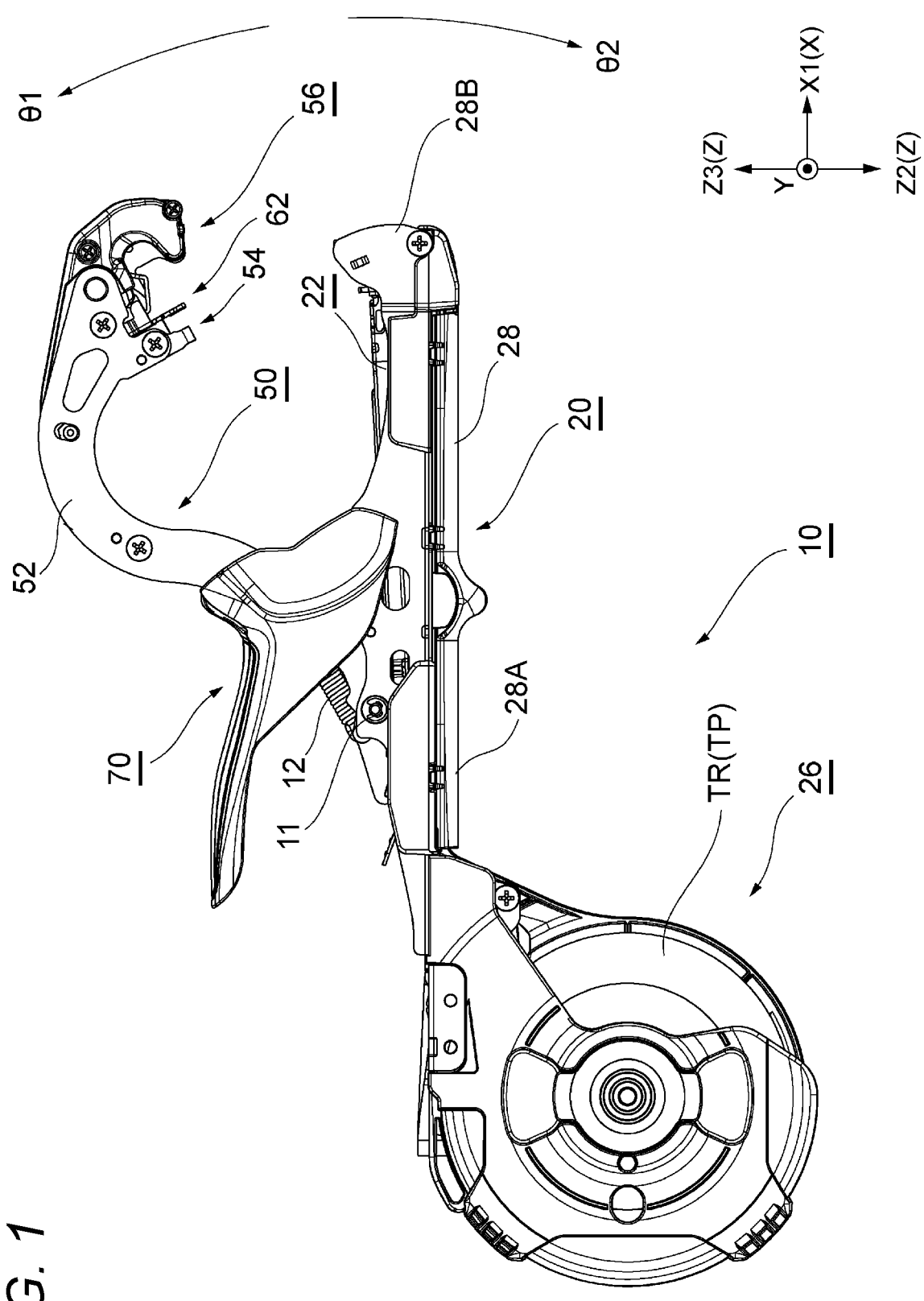
FIG. 1 is a right side view showing a binding machine according to a first embodiment of the present invention.
Figure 2:
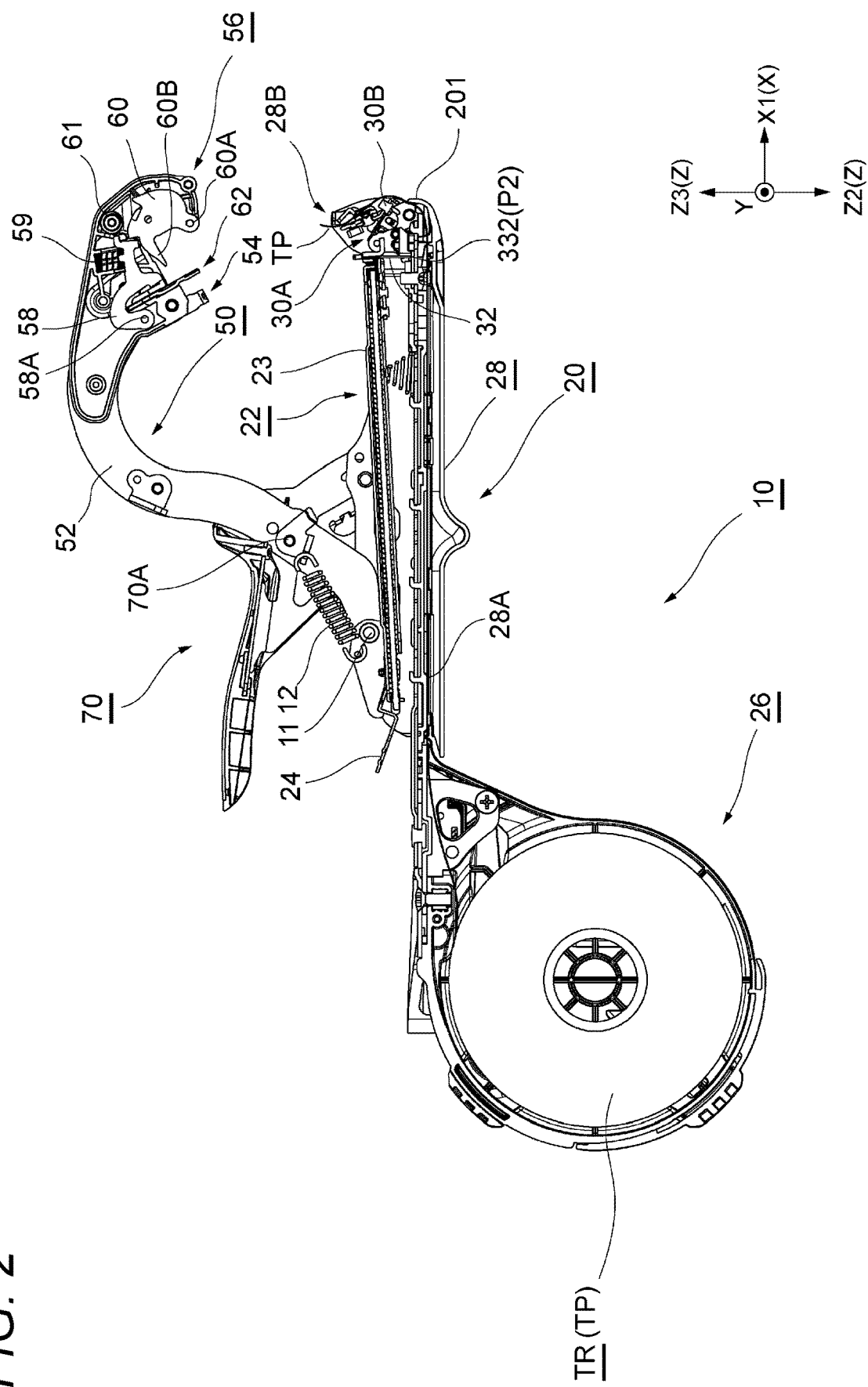
FIG. 2 is a cross-sectional view of the binding machine in a standby state.

Hereinafter, embodiments of the present invention will be described with reference to the drawings. The following embodiments are examples for illustrating the present invention and the present invention is not intended to be limited to those embodiments. FIG. 1 is a right side view of a binding machine 10 for gardening according to the present embodiment. FIG. 2 is a cross-sectional view of the binding machine 10 in FIG. 1.

In the present embodiment, for convenience, a side (a right side in FIG. 1) toward which a tape holder 28A extends from a tape magazine unit 26 in which the tape TP for binding is accommodated, heading for a tape guide 28B provided at a distal end of a binding machine 10 from which the tape TP is pulled out, may be referred to as a "front side", and an opposite side (a left side in FIG. 1) may be referred to as a "rear side".

Further, a side (upper side in FIG. 1) toward which the tape TP is pulled out from the tape guide 28B, heading for a tape holding unit 56 in a standby state, may be referred to as an "upper side", and an opposite side (lower side in FIG. 1) may be referred to as a "lower side". Hereinafter, a main configuration of the binding machine 10 will be outlined below. Thereafter, a characteristic structure of the binding machine 10 will be described in detail.

The binding machine 10 for gardening according to the present embodiment can be used, for example, in attraction binding operations on an agricultural crop (an example of an "object S to be bound"). The binding machine 10 includes a main handle 20, a staple magazine unit 22 rotatably attached to the main handle 20, a clincher arm 50 rotatably attached to the main handle 20, and an operation handle 70 rotatably attached to the clincher arm 50.

The main handle 20 is a member formed in an elongated linear shape. The main handle 20 includes a tape transport unit 28, a tape cutting unit 30, and a staple driver 32. A tape magazine unit 26 is attached to a rear end portion of the main handle 20. The main handle 20 and the tape magazine unit 26 may be integrally formed.

The tape magazine unit 26 is a mechanism that accommodates the tape TP wound on a reel (hereinafter, the wound tape TP may be referred to as a tape reel TR (an example of a "wound binding tape")). As illustrated in FIG. 1 and the like, the tape magazine unit 26 is provided at the rear end portion of the main handle 20.

The tape transport unit 28 includes the tape holder 28A and the tape guide 28B. The tape holder 28A is a path for transporting the tape TP from the tape magazine unit 26 to the tape guide 28B, and is laid along a longitudinal direction X of the main handle 20. The tape holder 28A includes a bottom portion facing one surface of the tape TP, and a lid portion facing the other surface of the tape TP (hereinafter, the other surface of the tape TP may be referred to as a "back surface"). The bottom portion and the lid portion are configured to be openable and closable with one side along the longitudinal direction X as a fulcrum, for example.

The tape guide 28B (see FIGS. 2 to 8) is a member that guides a tip of the tape TP upward from the tape holder 28A. The tape guide 28B is rotatably provided at a front end portion of the tape holder 28A. The tape guide 28B has wall surfaces facing at least a part of each of a front surface, a back surface, and both side portions of the tape TP, so as for the inserted tape TP not to come off easily.

The tape cutting unit 30 includes a cutting blade 30A that cuts the tape TP, and a lock mechanism 30B that locks and unlocks the cutting blade 30A. During replacement of the cutting blade 30A, the lock mechanism 30B releases locking of the cutting blade 30A and the cutting blade 30A is removed. The cutting blade 30A is provided rotatably and integrally with the tape guide 28B, and is biased by an elastic member (not illustrated) so as to face the rear side during a standby state and a holding operation. When performing a binding operation, the tape guide 28B is pressed against a tip portion 60B of a tape catch 60, the tape guide 28B and the cutting blade 30A rotate against a biasing force of the elastic member (not illustrated), and a tip portion of a blade edge of the cutting blade 30A moves so as to face the tape TP.

As a mechanism that cuts the tape TP, various mechanisms can be employed. For example, the tape TP may be rotated in conjunction with the tape guide 28B, thereby cutting the tape TP; the tape guide 28B and the cutting blade 30A may be configured to be movable in a straight advancing direction and the cutting blade 30A may be moved in a linear direction, thereby cutting the tape TP; and a member restraining the tape TP such as the tape guide 28B may be moved so as to cause the tape TP to be cut by the stationary cutting blade 30A.

The staple driver 32 includes a plate that is attached to the main handle 20 so as to face a vicinity of a front end of a staple accommodating portion 23 of the staple magazine unit 22. The staple driver 32 is formed to have a thickness, for example, substantially the same as a width of a staple ST or smaller than the width of the staple ST so as to drive only one staple ST.

When the clincher arm 50 to be described below rotates in a closing direction with respect to the main handle 20, the staple magazine unit 22 is pressed by the clincher arm 50 to rotate in a direction of approaching the main handle 20. Therefore, an upper end of the staple driver 32 attached to the main handle 20 relatively enters a space in the staple accommodating portion 23 to drive a leading staple ST in the staple accommodating portion 23 upward. A configuration of the staple driver 32 will be described in detail later.

The driven staple ST is clinched by a clincher 54 after penetrating the tape TP. Two overlapped tapes TP can be held between bent leg portions 101 and 102 of the staple ST and a crown portion 100 of the staple ST.

The staple magazine unit 22 is a member formed in an elongated linear shape. A rear end portion of the staple magazine unit 22 is attached to the rear end portion of the main handle 20 so as to be rotatable around a rotation shaft. However, since a rotation angle thereof is small, the staple magazine unit 22 may be expressed as being swingably attached to the main handle 20.

The staple magazine unit 22 includes the staple accommodating portion 23 that accommodates the staple ST, and a pusher unit 24. The staple accommodating portion 23 is disposed along the longitudinal direction X of the main handle 20. In order to accommodate the staple ST therein, the staple accommodating portion 23 includes a bottom surface formed to be elongated along the longitudinal direction X of the main handle 20, two sidewall surfaces standing from the bottom surface and facing each other, and a front wall surface against which a side surface of the leading staple ST is pressed.

In the staple accommodating portion 23, a plurality of staples ST can be accommodated. Adjacent staples ST can be connected to each other with an adhesive, for example, to form a column of a staple group as a whole. A configuration of the staple ST will be described in detail later.

The pusher unit 24 is, for example, a member removably attached to the staple accommodating portion 23 in order to push the staples ST accommodated in the staple accommodating portion 23 forward. The pusher unit 24 includes a compression spring that pushes staples ST at the rear end among the plurality of staples ST forward, and a cover that covers the staple accommodating portion 23 from above. By pulling out the pusher unit 24 from the staple accommodating portion 23 and opening the staple accommodating portion 23 to above, the staples ST can be set in the staple accommodating portion 23 from above.

The clincher arm 50 is attached by a rotation shaft 11 provided in a vicinity of a rear end portion so as to be rotatable with respect to the main handle 20, and is biased by a tension spring 12 in a direction in which an angle with respect to the main handle 20 is increased (an opening direction θ1 in which the clincher arm 50 opens in a direction opposite to a closing direction θ2 to be described later). The clincher arm 50 includes an arm portion 52, the clincher 54, and the tape gripping unit 56 (an example of a "gripping portion"). The arm portion 52 has a shape that extends in a curved shape up to a front end portion so that a C-shaped opening can be formed between the arm portion 52 and the main handle 20.

The clincher 54 is a member for performing clinching by folding the leg portions of the staple ST. The clincher 54 is provided at a front end portion of the clincher arm 50 so as to face a distal end of the staple driver 32 when the clincher 54 is rotated in the closing direction θ2, which is a direction in which an angle between the clincher arm 50 and the main handle 20 is reduced, and which is opposite to the opening direction θ1.

With such a configuration, the leg portions of the staple ST driven by the staple driver 32 are clinched by the clincher 54 and are folded inward. The configuration including the clincher 54 that is provided on the clincher arm 50 and that is for performing the binding processing may be referred to as a "binding portion". A configuration of the clincher 54 will be described in detail later.

The tape holding unit 56 is a mechanism that holds an end portion of the tape TP pulled out from the tape guide 28B at a tip of the main handle 20. The tape holding unit 56 is provided at a tip of the arm portion 52 of the clincher arm 50. The tape holding unit 56 includes a lock plate 58, the tape catch 60, and a tape plate 62.

The lock plate 58 is configured to be rotatable with a shaft portion 58A provided at one end portion thereof serving as a fulcrum, and the other end portion thereof is biased toward the tape catch 60 by a coil spring 59. The lock plate 58 locks the tape catch 60 by engaging with the tape catch 60 under the biasing of the coil spring 59, and can fix the tape catch 60 at a position separated from the tape plate 62.

The tape catch 60 is provided so as to be rotatable with a shaft portion 60A serving as a fulcrum, and is biased toward the tape plate 62 by a torsion coil spring 61. The tape catch 60 is configured such that, when locking by the lock plate 58 is released at the time of pulling out of the tape, the tip portion 60B having a tapered shape is moved toward the tape plate 62 under the biasing of the torsion coil spring 61.

The tape plate 62 is disposed to face the tape catch 60, and a tip portion thereof extends from the lock plate 58 toward the tape cutting unit 30. The extended portion of the tape plate 62 and the tip portion 60B of the tape catch 60 clamp the tape TP. When a user reduces a force of gripping the operation handle 70 while the tape TP is being held, the clincher arm 50 is rotated in the opening direction by the tension spring 12, and thus the tape TP can be pulled upward via the tape guide 28B.

The operation handle 70 is a portion to be gripped by the user. A shaft portion 70A at a substantially intermediate part thereof is rotatably attached to the clincher arm 50, and a front end portion of the operation handle 70 is attached to the main handle 20. With such a configuration, the clincher arm 50 is configured to be openable and closable relative to the main handle 20 according to an opening/closing operation of the operation handle 70, based on a principle of leverage using a portion to be gripped by a user as a force application point, a rotation shaft of the clincher arm 50 as a fulcrum, and the front end portion attached to the main handle 20 as an action point.

[Operation of Binding Machine 10]

Figure 3:
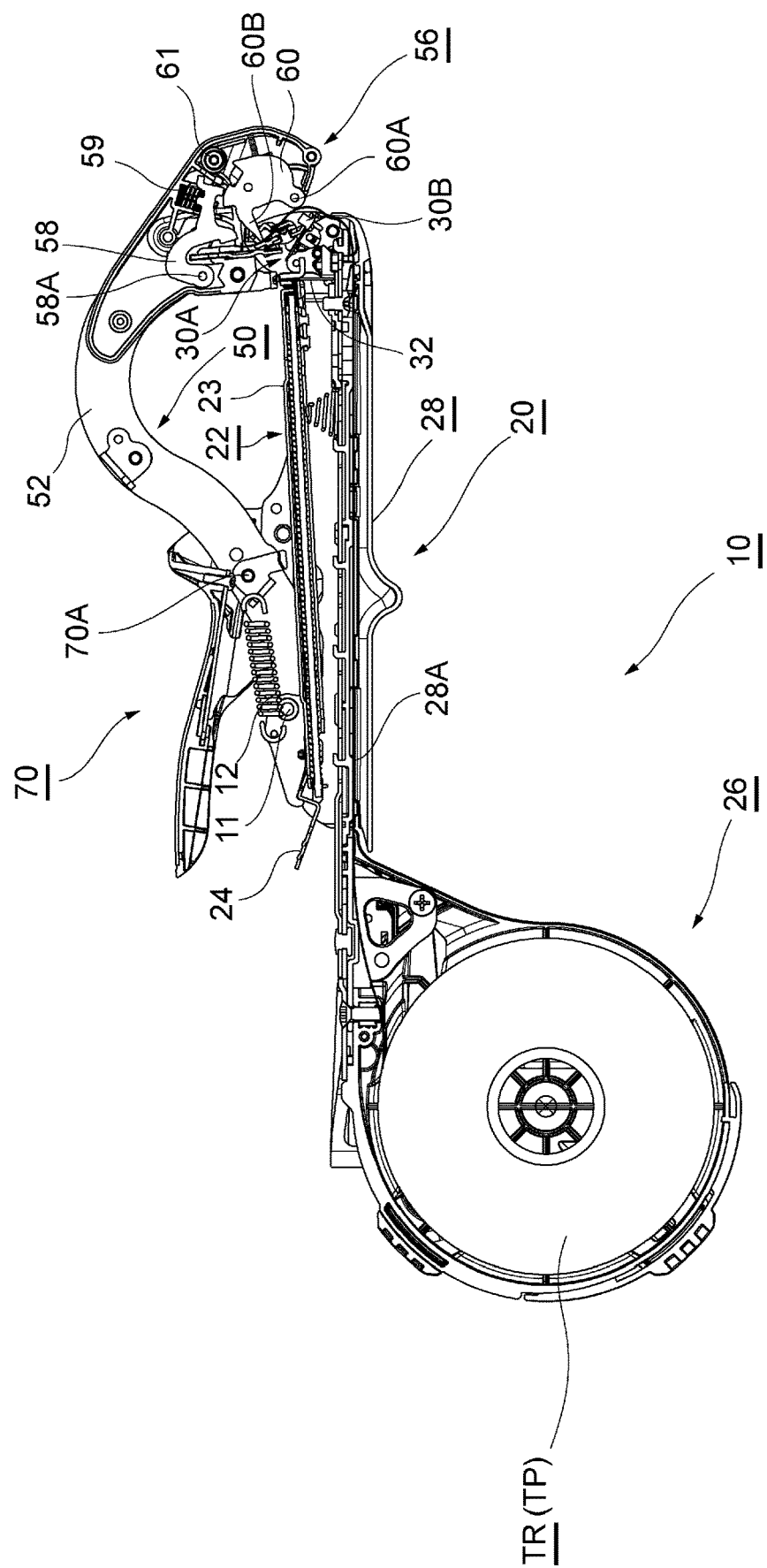
FIG. 3 is a cross-sectional view of the binding machine in a state where a tape is gripped.

Next, the operation of the binding machine 10 will be described with reference to FIGS. 4 to 8. The clincher arm 50 is constantly biased by the tension spring 12, and in a standby state illustrated in FIGS. 1 and 2, the clincher arm 50 is in an open state with respect to the main handle 20. When the user grips the operation handle 70 and the main handle 20 from this state, the clincher arm 50 is rotated in the closing direction with respect to the main handle 20 as illustrated in FIG. 3.

Figure 4:
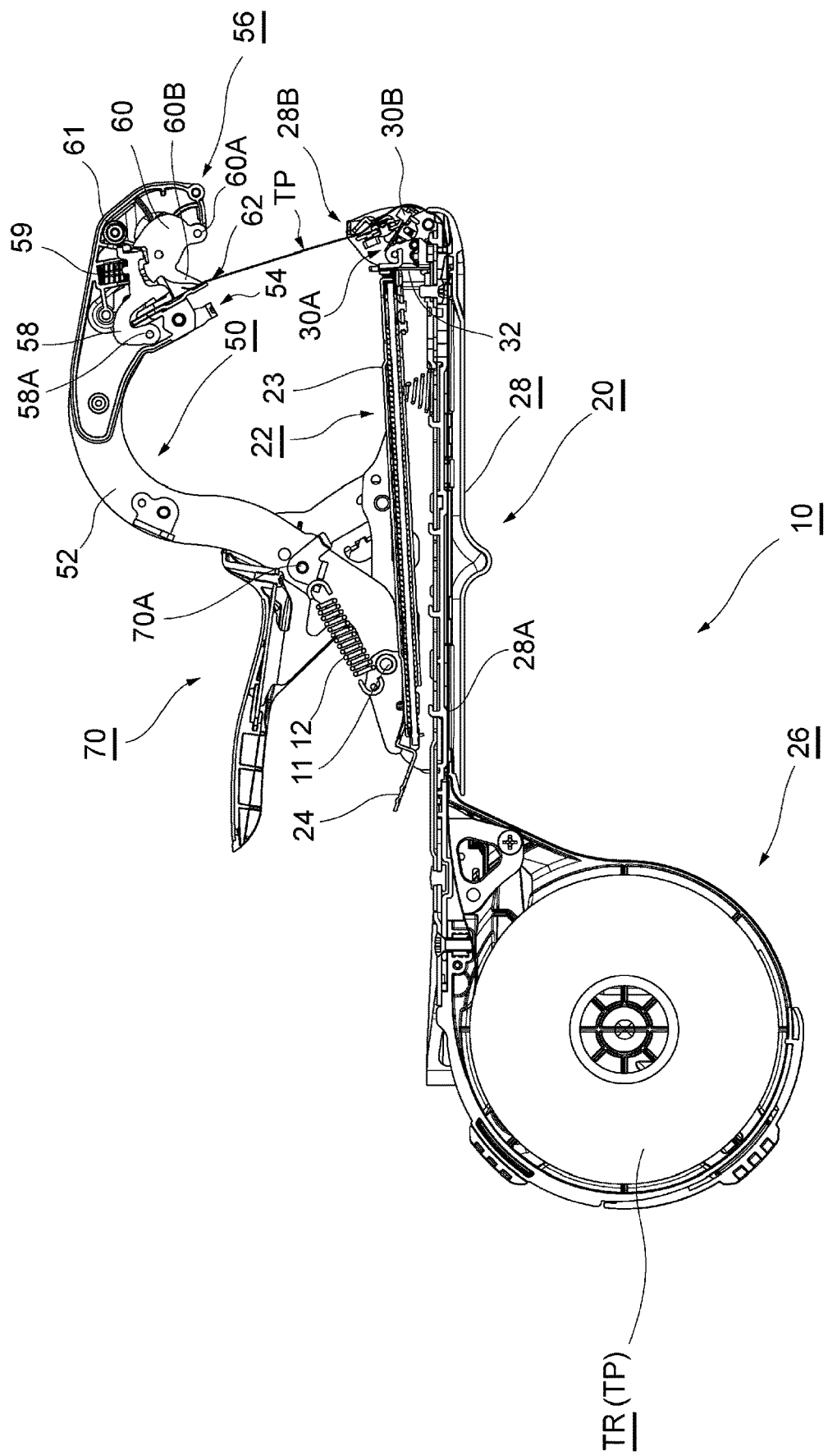
FIG. 4 is a cross-sectional view of the binding machine in a state where the tape is pulled out.

Further, when the clincher arm 50 rotates in the closing direction to a predetermined position with respect to the main handle 20, the tape holding unit 56 of the clincher arm 50 holds the tape TP in order to pull out the tape TP (see FIG. 4).

Thereafter, when gripping on the main handle 20 is loosened to rotate the clincher arm 50 in the opening direction with respect to the main handle 20, as illustrated in FIG. 4, the tape holding unit 56 of the clincher arm 50 and the tape guide 28B of the main handle 20 are separated from each other with the tape TP being held, and the tape TP is stretched between the clincher arm 50 and the main handle 20.

Figure 5:
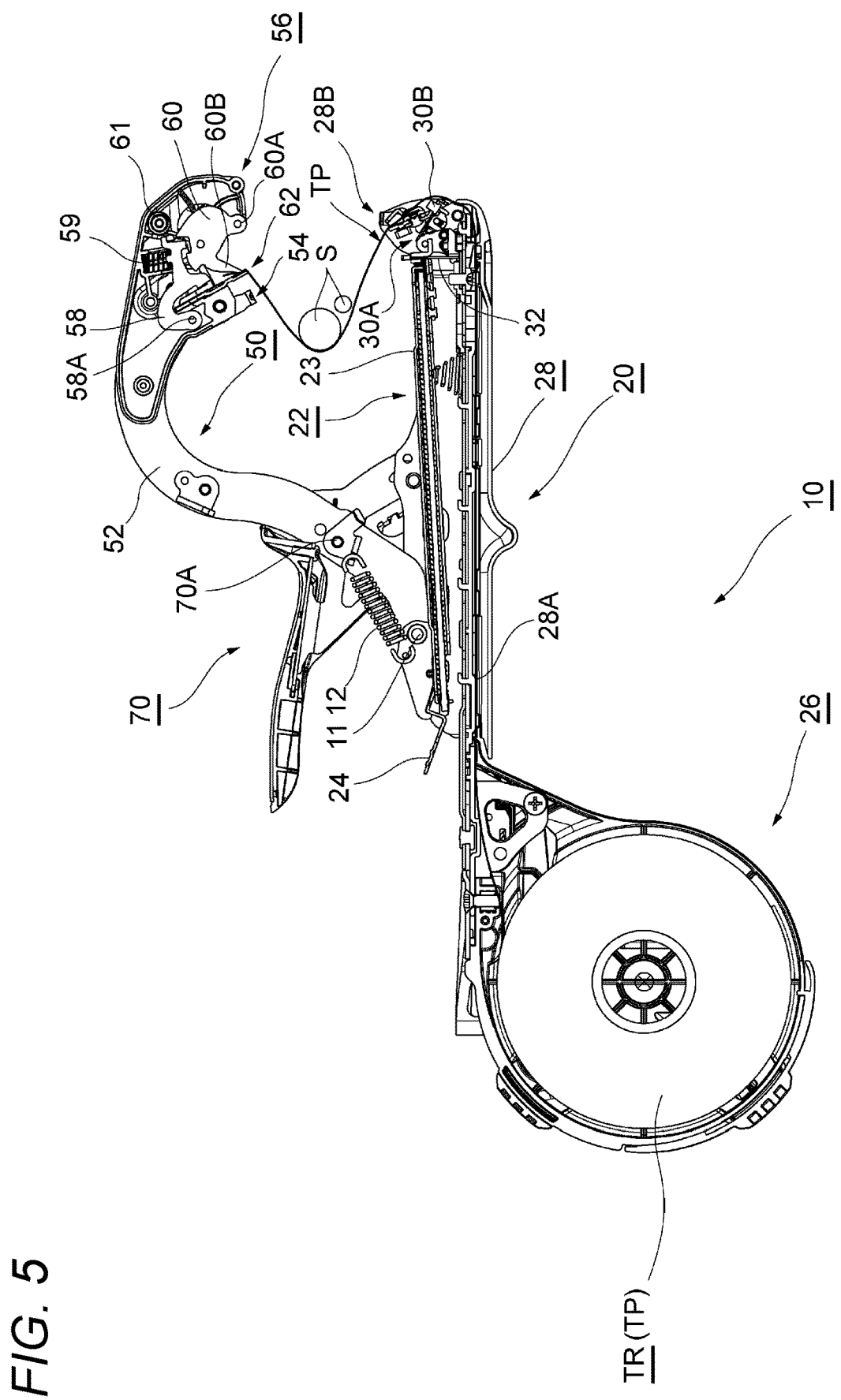
FIG. 5 is a cross-sectional view of the binding machine in a state where a binding object is inserted.
Figure 6:
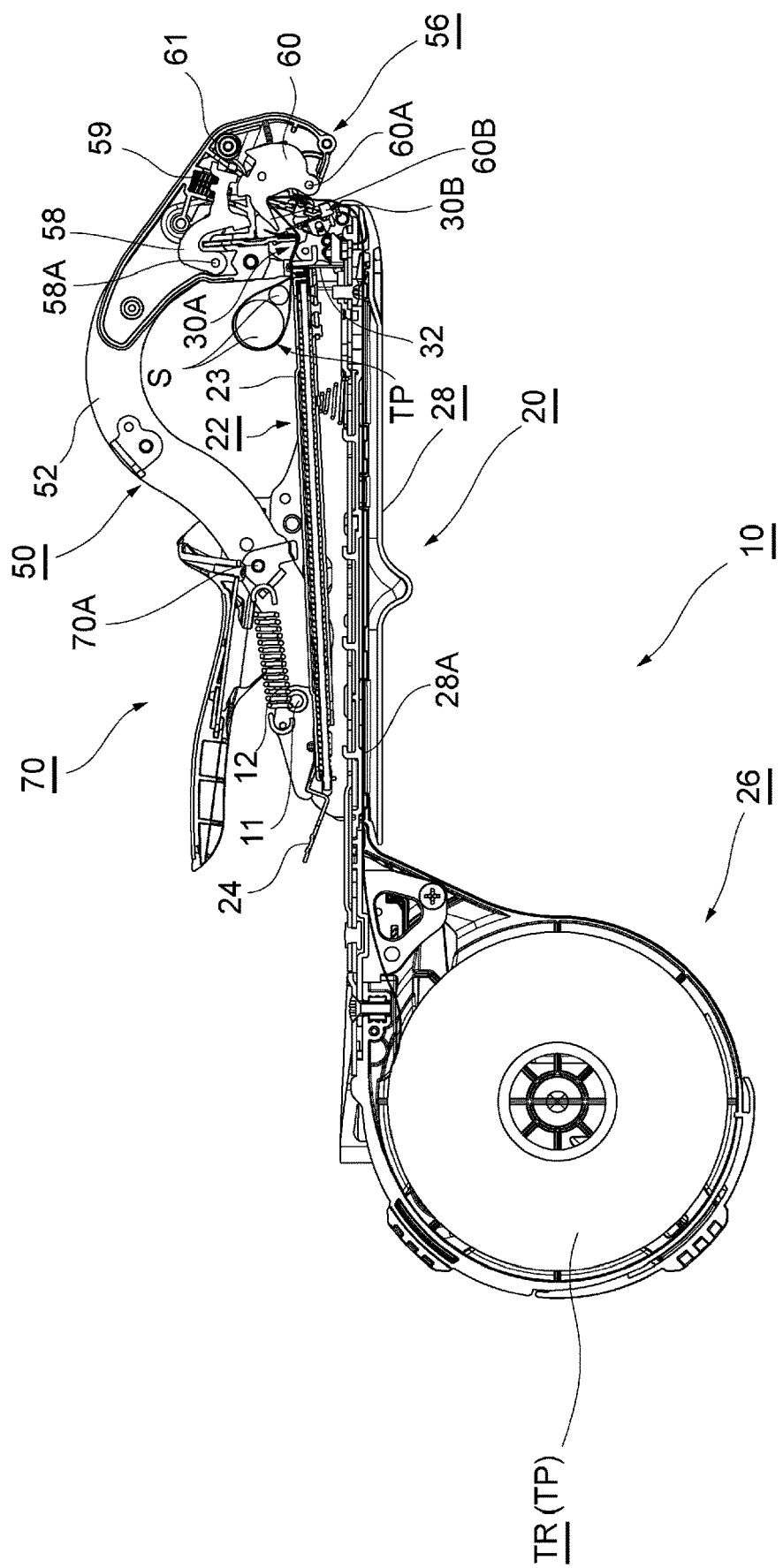
FIG. 6 is a cross-sectional view of the binding machine in a state where driving of a staple is started.

As shown in FIG. 5, when the binding object S such as a seedling or a branch is put in from the outside of the tape TP stretched in this state and the clincher arm 50 is rotated again in the closing direction, as shown in FIG. 6, a tape loop of the tape TP that binds the binding object S is formed. Since the staple magazine unit 22 is pressed by the clincher arm 50 and rotates in the closing direction, the staple driver 32 drives the staple ST.

Figure 7:
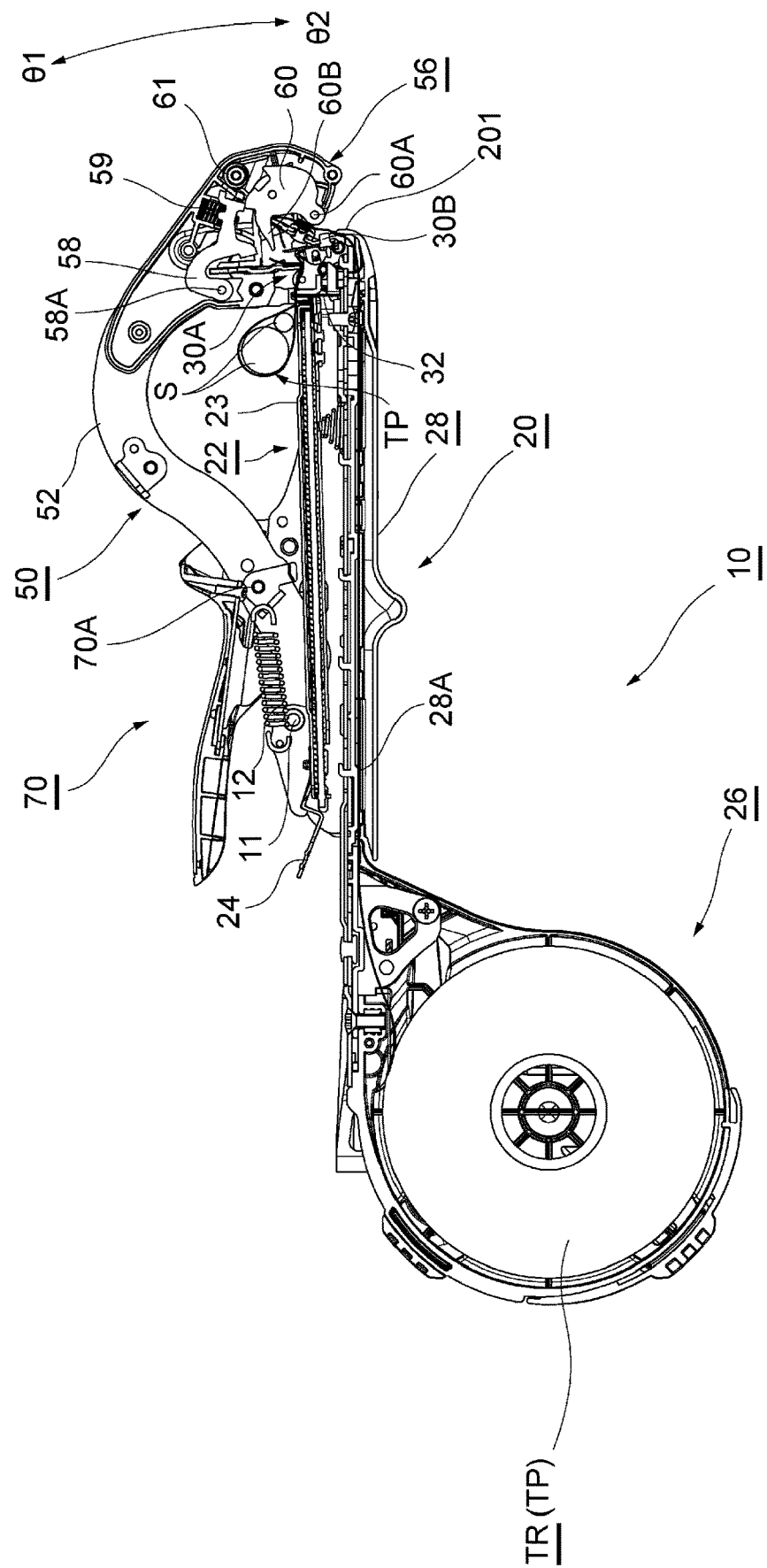
FIG. 7 is a cross-sectional view of the binding machine in a state where the staple is being driven.
Figure 8:
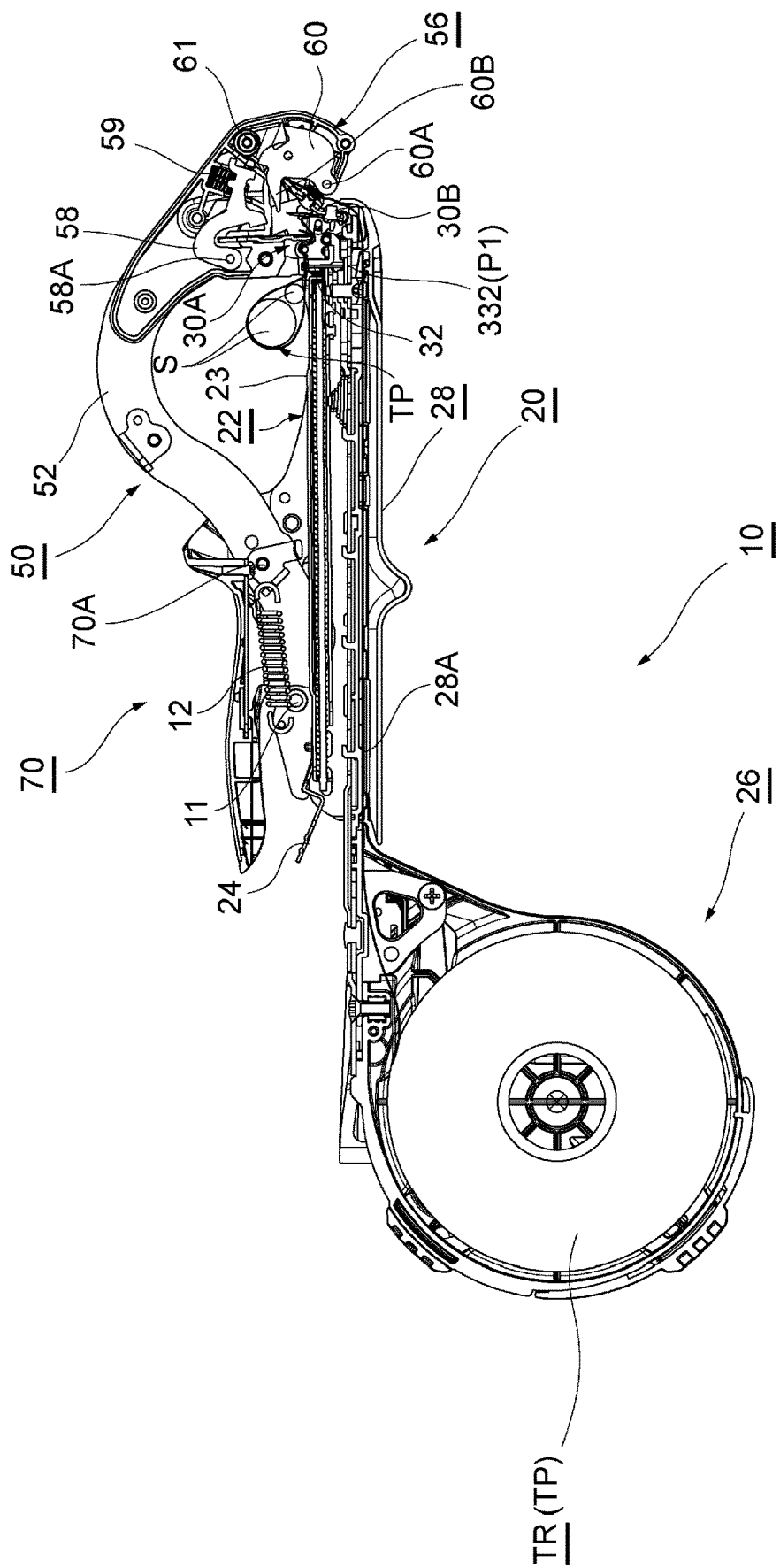
FIG. 8 is a cross-sectional view of the binding machine in a state where the driving of the staple is completed.

Therefore, as shown in FIGS. 7 and 8, both end portions of the tape loop that binds the binding object S are bound by the staple ST. The tape TP is cut by the cutting blade 30A, and the binding operation is executed. In this way, the gripping operation is performed in a first gripping operation, and the binding operation is performed in a second gripping operation. Then, the binding object S can be bonded by alternately performing the gripping operation and the binding operation.

Hereinafter, the characteristic structure of the binding machine 10 will be described in detail.

[Staple Driver]

Figure 9:
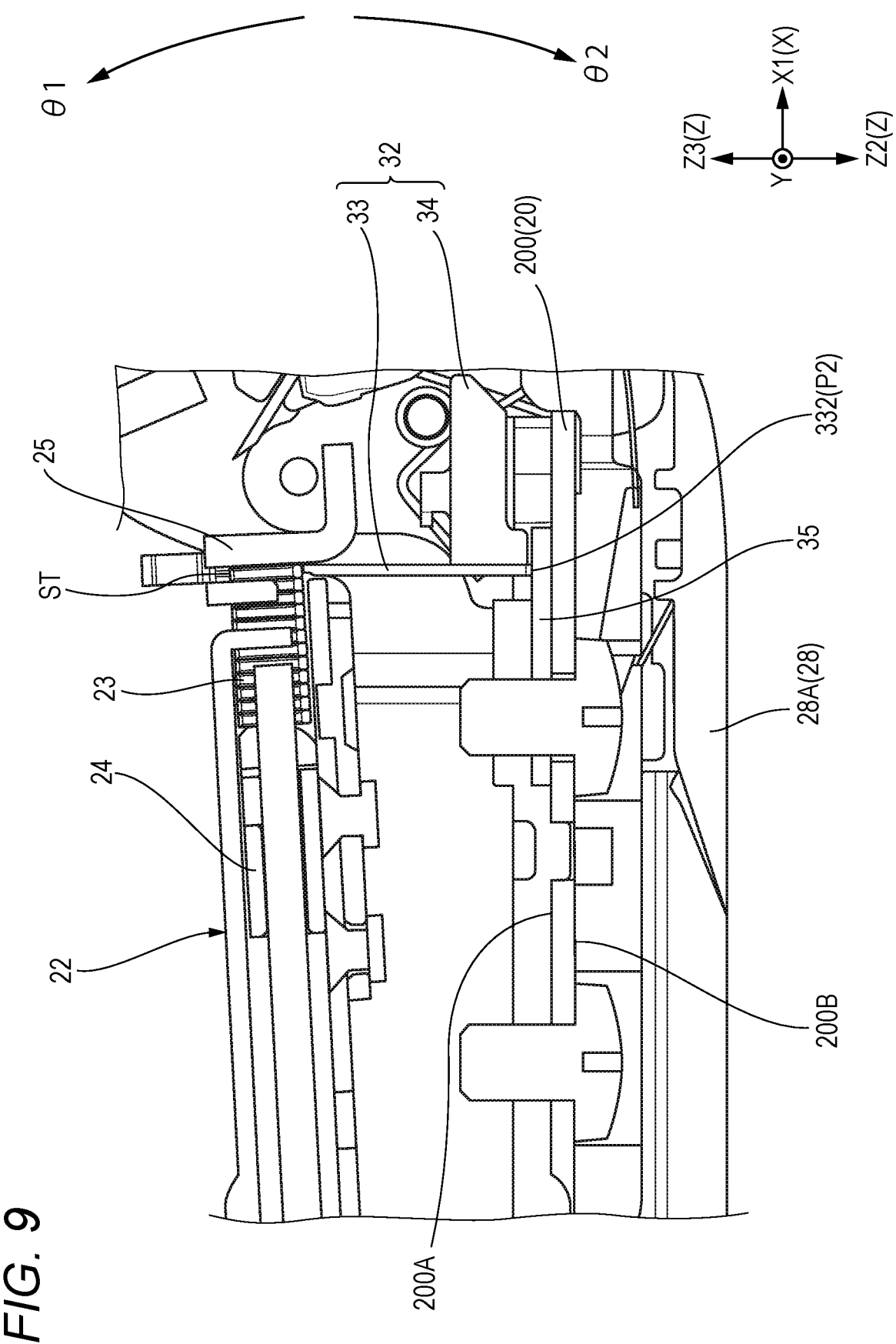
FIG. 9 is an enlarged cross-sectional view showing a staple driver in a state where the driving of the staple is started as shown in FIG. 6.
Figure 10:
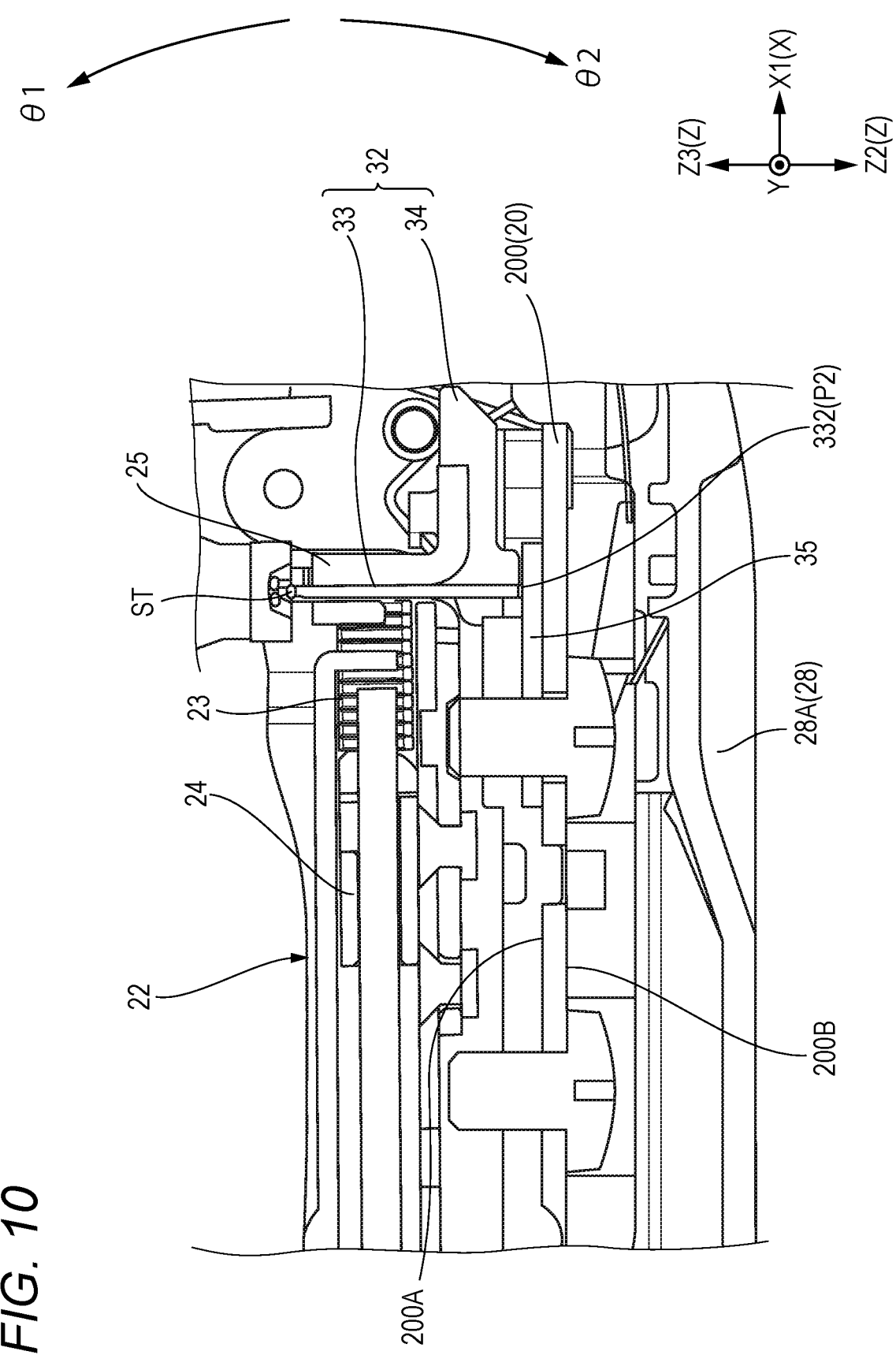
FIG. 10 is an enlarged cross-sectional view showing the staple driver in a state where the driving of the staple is completed as shown in FIG. 8.

FIG. 9 is an enlarged cross-sectional view showing the staple driver 32 in a state where driving of the staple ST is started as shown in FIG. 6, and FIG. 10 is an enlarged cross-sectional view showing the staple driver 32 in a state where driving of the staple ST is completed as shown in FIG. 8. As shown in FIGS. 9 and 10, a bottom wall 200 of the main handle 20 includes a lower surface 200B facing the tape holder 28A of the tape transport unit 28 and an upper surface 200A facing the staple magazine unit 22.

The staple driver 32 is attached to the upper surface 200A. In the present embodiment, as shown in FIGS. 9 and 10, the staple driver 32 has a driving portion 33 for driving the leading staple ST toward the clincher 54, and attachment portions 34 for attaching the driving portion 33 to the main handle 20, and a washer member (backup washer) 35 provided between the bottom wall 200 and the driving portion 33. The washer member 35 is a metal component that is subjected to heat treatment to improve wear resistance, and is less likely to wear than the bottom wall 200. In order to reduce a friction coefficient, silicon grease or the like may be applied to a surface of the washer member 35.

A distal end (upper end) 33D of the driving portion 33 is pressed against a clincher guide 25 that constitutes a front wall surface of the staple accommodating portion 23 due to a biasing force of a torsion coil spring 36. As described above, the staple ST accommodated in the staple accommodating portion 23 is pressed against the clincher guide 25 due to a biasing force of the pusher unit 24. Since the leading staple ST and the distal end 33D of the staple driver 32 are both regulated in position in the longitudinal direction X of the main handle 20 by the clincher guide 25, the distal end 33D of the driving portion 33 faces the crown portion of the leading staple ST.

Figure 11:
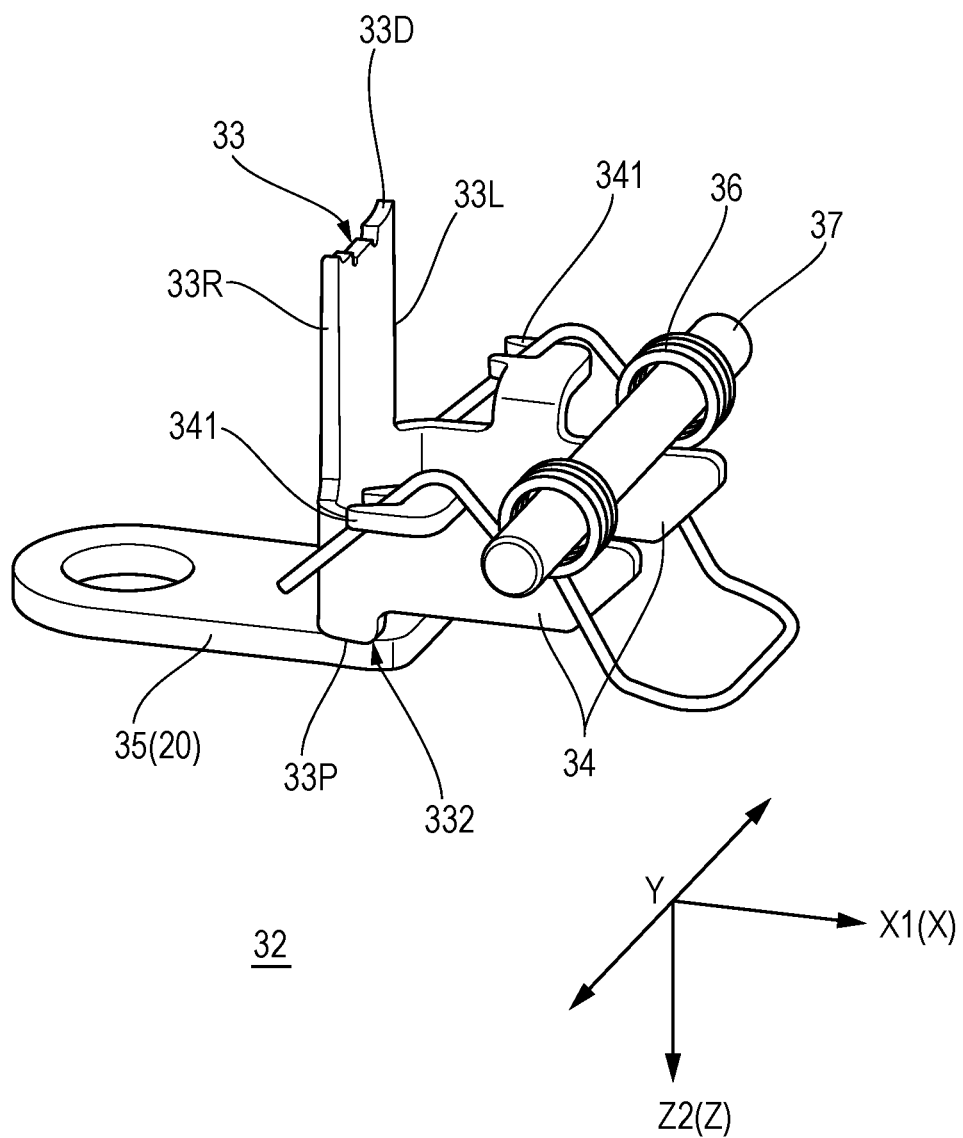
FIG. 11 is a perspective view of the staple driver shown in FIG. 9.

FIG. 11 is a perspective view of the staple driver 32 shown in FIG. 9. The driving portion 33 is formed in a substantially rectangular plate shape and extends in a direction away from the bottom wall 200 of the main handle 20. The driving portion 33 has the distal end 33D, a base end 33P, and side edges 33L, 33R that constitute four sides of the driving portion 33.

As described above, the distal end 33D of the driving portion 33 faces the staple ST. The base end (lower end) 33P opposite to the distal end 33D or a portion in a vicinity of the base end 33P is in abutted with the bottom wall 200 or the washer member 35 attached to the bottom wall 200. In other words, the driving portion 33 extends such that the base end 33P, which is one end of the driving portion 33, is abutted with the main handle 20 or the like, and the distal end 33D, which is the other end of the driving portion 33, faces the staple ST. The base end 33P and the portion in the vicinity thereof form an example of "an end portion of the driving portion disposed on a side near the main handle".

The attachment portions 34 are respectively provided on the side edges 33L, 33R of the driving portion 33, and extend toward a front end portion 201 of the main handle 20. In the illustrated example, the attachment portions 34 are provided near the base end 33P of the driving portion 33. The attachment portion 34 is provided with an engaging portion 341 that engages with the torsion coil spring 36 that is a biasing means. The engaging portion 341 is provided on an upper edge of the attachment portion 34 and projects outward in an axial direction Y of the rotation shaft 11 of the binding machine 10.

The torsion coil spring 36 (an example of a "biasing means") is supported by a shaft 37 of the main handle 20 in a state where the torsion coil spring 36 stores energy. The torsion coil spring 36 biases the engaging portion 341 in a direction from the upper surface 200A of the bottom wall 200 of the main handle 20 toward the lower surface 200B while biasing the engaging portion 341 in a direction toward the front end portion 201 of the main handle 20.

In the following description, in the longitudinal direction (a front-rear direction) X of the main handle 20, a (forward) direction from the rotation shaft 11 of the main handle 20 to the front end portion 201 may be referred to as a first direction X1. In a height direction (an upper-lower direction) Z orthogonal to both the longitudinal direction X of the main handle 20 and the axial direction Y of the rotation shaft 11, a (downward) direction from the upper surface 200A of the bottom wall 200 toward the lower surface 200B may be referred to as a second direction Z2. When viewed from the staple driver 32 attached to the upper side of the main handle 20, the second direction Z2 is a direction in which the staple driver 32 approaches the main handle 20.

The end portion (base end portion) 332 including the base end 33P of the driving portion 33 and a portion in the vicinity thereof is arranged on the side near the main handle 20. In a state where the clincher arm 50 is rotated in the closing direction θ2 for closing (with reference to, for example, FIG. 8), the end portion 332 is located at a first position P1. In a state where the clincher arm 50 is rotated in the opening direction θ1 for opening (with reference to, for example, FIG. 2), the end portion 332 is located at a second position P2 that is closer to the front end of the main handle 20 than the first position P1. That is, the staple driver 32 is configured to slide back and forth along the longitudinal direction X of the main handle 20 so as to be displaceable slightly.

According to the binding machine 10 of the first embodiment of the present invention configured as described above, as shown in FIG. 11, the driving portion 33 for driving the staple ST can be configured in a plate shape that extends straight over an entire length from the distal end 33D on which a reaction force from the staple ST acts to the base end 33P supported by the main handle 20.

A staple driver in the related art is configured with a leaf spring whose base end side is bent in an L shape, and the bent portion is supported by the bottom wall 200 of the main handle 20. Since the reaction force from the staple ST is received via the bent portion, a crack due to a fatigue phenomenon may occur in the repeatedly deformed bent portion. Correspondingly, in the first embodiment of the present invention, since the driving portion 33 has a straight plate shape, the reaction force from the staple ST can be received without going through the bent portion. The staple driver 32 is less likely to be damaged even if the binding machine 10 is repeatedly used.

Preferably, the distal end 33D of the driving portion 33 are allowed displacing back and forth following a movement of the staple accommodating portion 23. A staple driver in the related art is formed in a leaf spring that deforms itself. Correspondingly, in the first embodiment, the end portion 332 of the staple driver 32 is configured to be slidable on the bottom wall 200 of the main handle 20 or the washer member 35 fixed to the bottom wall 200.

Therefore, even if the staple driver 32 itself does not deform, the distal end 33D of the driving portion 33 can follow the movement of the staple accommodating portion 23. The staple driver 32 is less likely to be damaged even if the binding machine 10 is repeatedly used. Regarding a material of the staple driver 32, repeated durability against bending is not necessarily required, so that an inexpensive material can be selected.

The staple driver 32 is biased in the first and second directions X1, Z2 by a biasing means such as the torsion coil spring, and is positioned such that the distal end 33D is not separated from the front wall surface of the staple accommodating portion 23. The biasing means is configured separately from the staple driver 32 and can be replaced separately.

Second Embodiment

Figure 12:
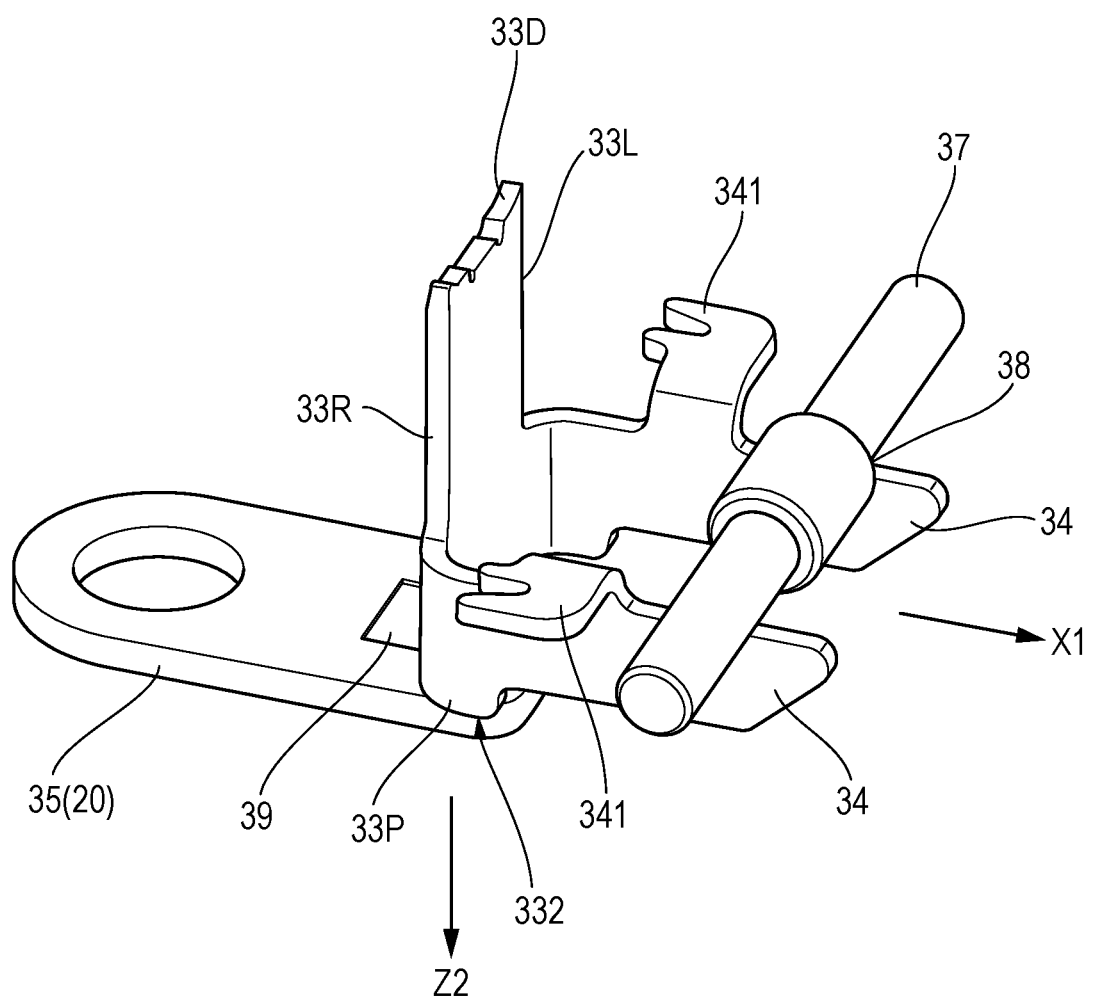
FIG. 12 is a perspective view showing a staple driver according to a second embodiment of the present invention.

For a second embodiment, description of matters common to the first embodiment will be omitted, and only different points will be described. FIG. 12 is a perspective view showing a staple driver 32 according to the second embodiment of the present invention. The second embodiment is different from the first embodiment in the biasing means that biases the staple driver 32 in the first direction X1 and the second direction Z2.

In the second embodiment, the staple driver 32 is biased by magnets 38, 39 (an example of a "biasing means") instead of the torsion coil spring 36. The staple driver 32 is made of a ferromagnetic material to be attracted to a magnet. The magnet (first magnet) 38 for biasing the staple driver 32 in the first direction X1 is arranged at a position advanced from the driving portion 33 in the first direction X1. In the illustrated example, the magnet 38 is fixed to a peripheral surface of the shaft 37 facing the driving portion 33 from the front.

Similarly, the magnet (second magnet) 39 for biasing the staple driver 32 in the second direction Z2 is arranged at a position advanced from the driving portion 33 in the second direction Z2. In the illustrated example, the magnet 39 is embedded in the washer member 35 facing the staple driver 32 from below.

According to the second embodiment, similarly to the first embodiment, the staple driver 32 can be configured to be displaceable between the first position P1 (with reference to FIG. 8) and the second position P2 (with reference to FIG. 2). As compared with the first embodiment, the number of elastically deformable members is reduced, so that the life of the binding machine 10 can be extended.

Third Embodiment

Figure 13:
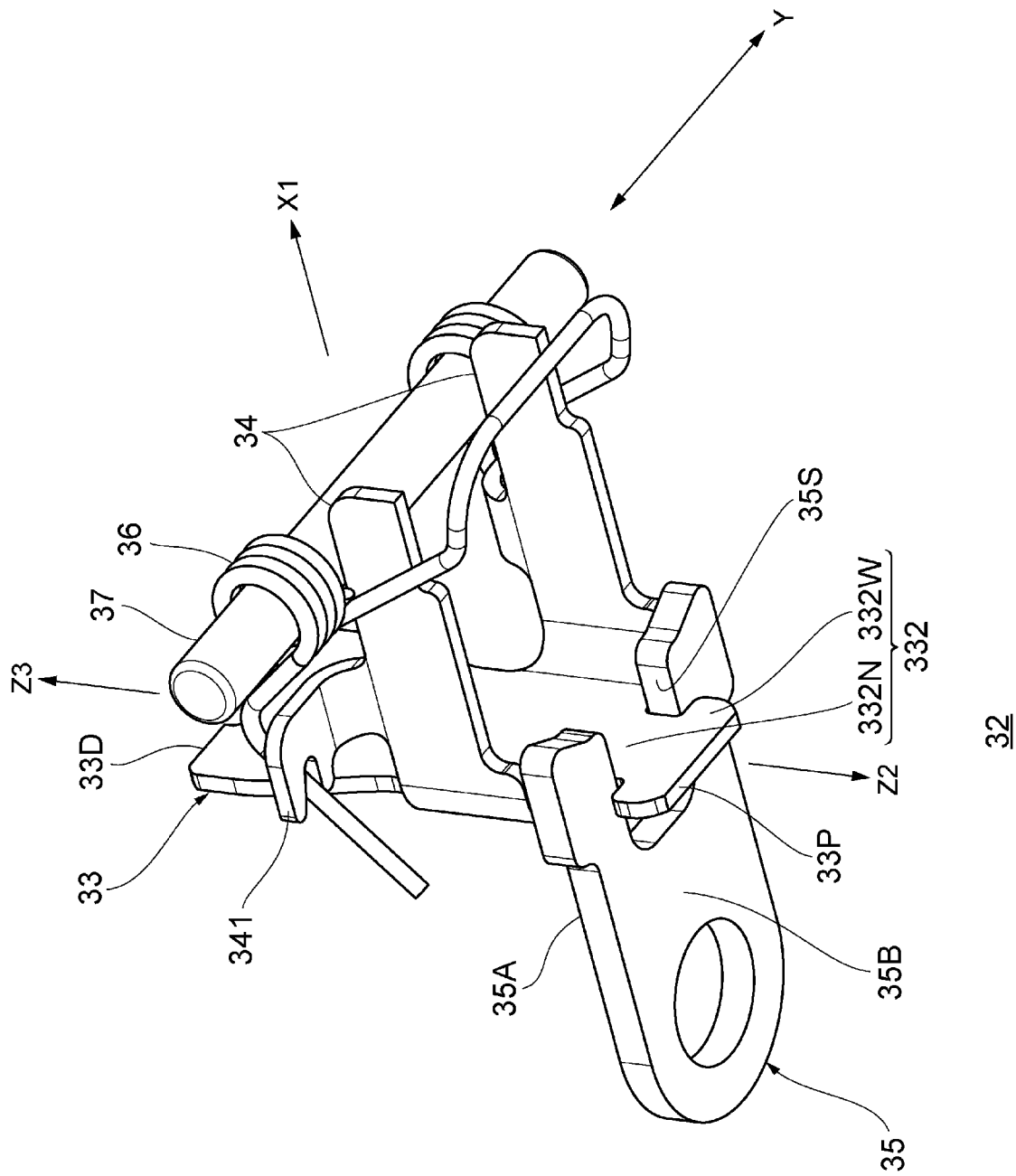
FIG. 13 is a perspective view showing a staple driver according to a third embodiment of the present invention.

FIG. 13 is a perspective view showing a staple driver 32 according to a third embodiment of the present invention.

The third embodiment is different from the first embodiment in that the washer member 35 in the third embodiment is provided with a restricting portion 35S that restricts separation of the driving portion 33 from the washer member 35, that is, restricts a movement of the driving portion 33 in a direction away from the main handle 20 (restricts a movement of the staple driver 32 in the directions θ1, θ2 in which the clincher arm 50 rotates). In the present embodiment, the restricting portion 35S is configured as a penetrating portion 35S that penetrates a front surface 35A and a back surface 35B of the washer member 35, and a restricting structure (332N, 332W, 35S) formed on a base end 33P of the driving portion 33 is fitted into the penetrating portion 35S. Accordingly, separation of the driving portion 33 from the washer member 35 can be restricted.

If the restricting portion 35S is not provided, staple jamming may occur, and when the clincher arm 50 rotates in the opening direction θ1 in which the clincher arm 50 opens with respect to the main handle 20 (with reference to FIG. 7 in the first embodiment), the driving portion 33 may be lifted up (separated from the washer member 35) together with the staple ST that jams. In this case, in a process from a state where the driving of the staple ST is completed (with reference to FIG. 10 in the first embodiment) to a state where the staple magazine unit 23 returns to an original position (direction θ1), the driving portion 33 may be loaded and deformed.

To the contrary, by providing the restricting portion 35S and fitting the restricting structure (332N, 332W, 35S) thereto, separation of the driving portion 33 from the washer member 35 is restricted even if the staple jamming occurs, so that the above deformation can be prevented. In the illustrated example, the restricting structure (332N, 332W, 35S) includes a narrow portion 332N and a wide portion 332W that are provided on the staple driver 32.

Figure 14:
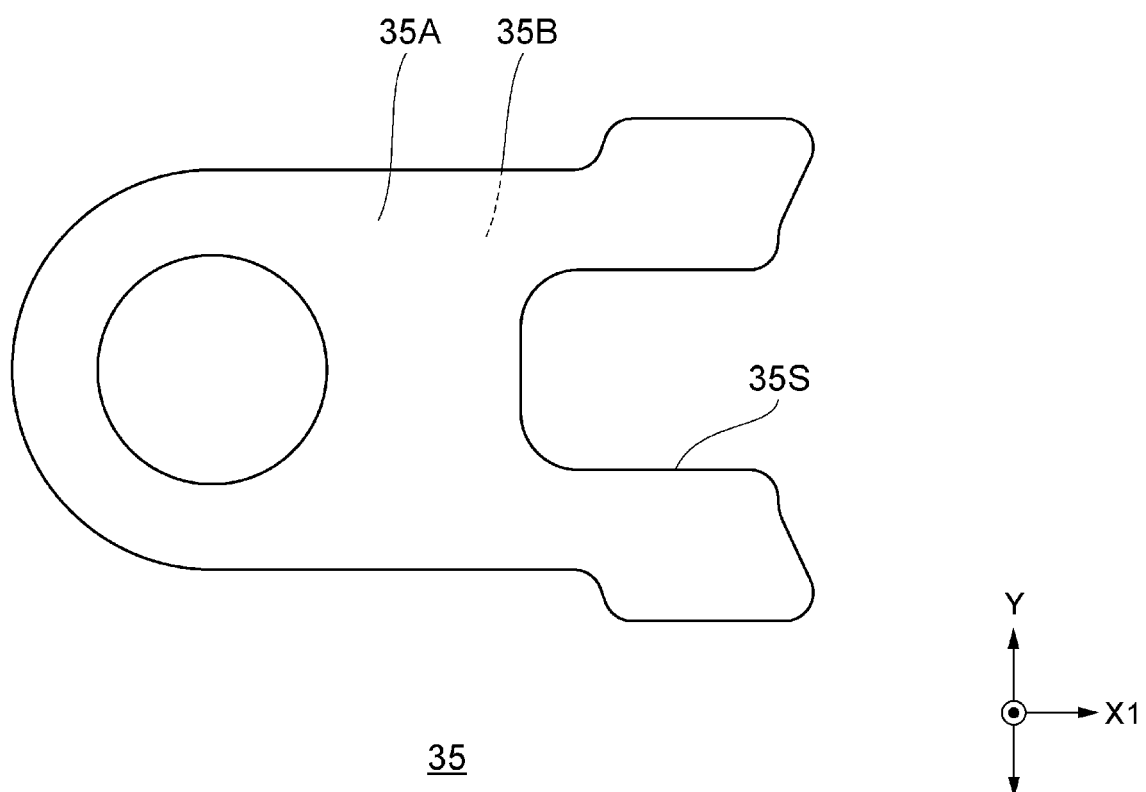
FIG. 14 is a plane view showing a washer member shown in FIG. 13.

FIG. 14 is a plane view showing the washer member 35 shown in FIG. 13. As shown in FIG. 14, the washer member 35 has a penetrating portion (restricting portion) 35S as a slit through which the narrow portion 332N is inserted. The penetrating portion (restricting portion) 35S serving as a slit penetrates the front surface 35A and the back surface 35B of the washer member 35, and extends along the first direction X1 toward the front end portion 201 (shown in FIG. 2) of the main handle 20. The washer member 35 is fixed to the bottom wall 200 of the main handle 20 with a fastening screw (with reference to FIG. 9 in the first embodiment).

Figure 15:
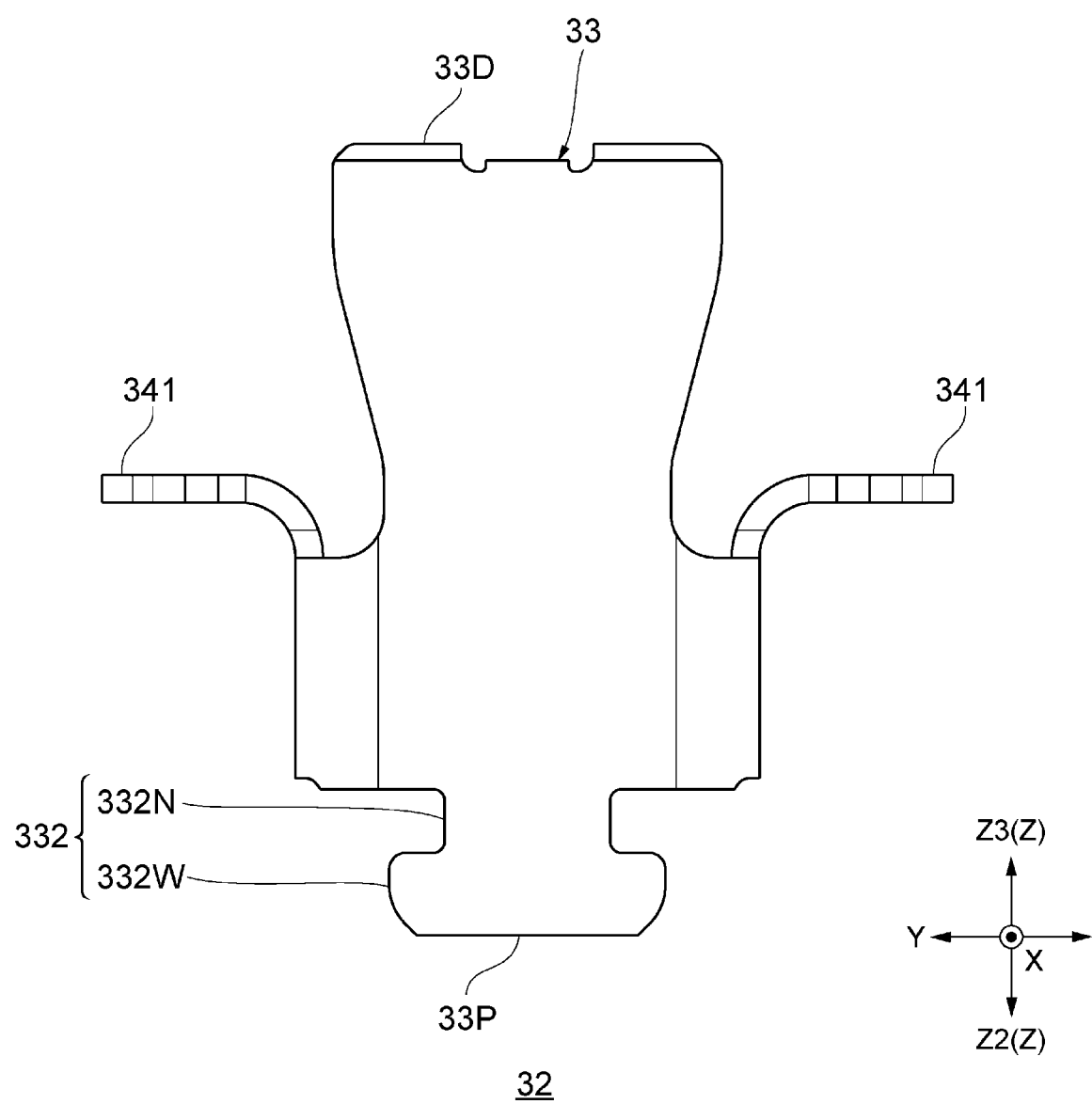
FIG. 15 is a front view showing the staple driver shown in FIG. 13.

FIG. 15 is a front view showing the driving portion 33 shown in FIG. 13. As shown in FIG. 15, the narrow portion 332N and the wide portion 332W are provided at the base end portion 332 of the driving portion 33. In the width direction Y (shown in FIG. 1) of the main handle 20, the narrow portion 332N is formed to be narrower than the slit 35S. The wide portion 332W is provided at the distal end (lower end) of the narrow portion 332N and is formed to be wider than the narrow portion 332N and the slit 35S.

As shown in FIG. 13, in a state where the narrow portion 332N is inserted through the slit 35S, both end portions of the wide portion 332W face the washer member 35 from a back of the washer member 35. When the staple jamming occurs and the driving portion 33 is pulled, the wide portion 332W is abutted with the back surface 35B of the washer member 35, and a movement of the driving portion 33 is restricted.

Fourth Embodiment

Figure 16:
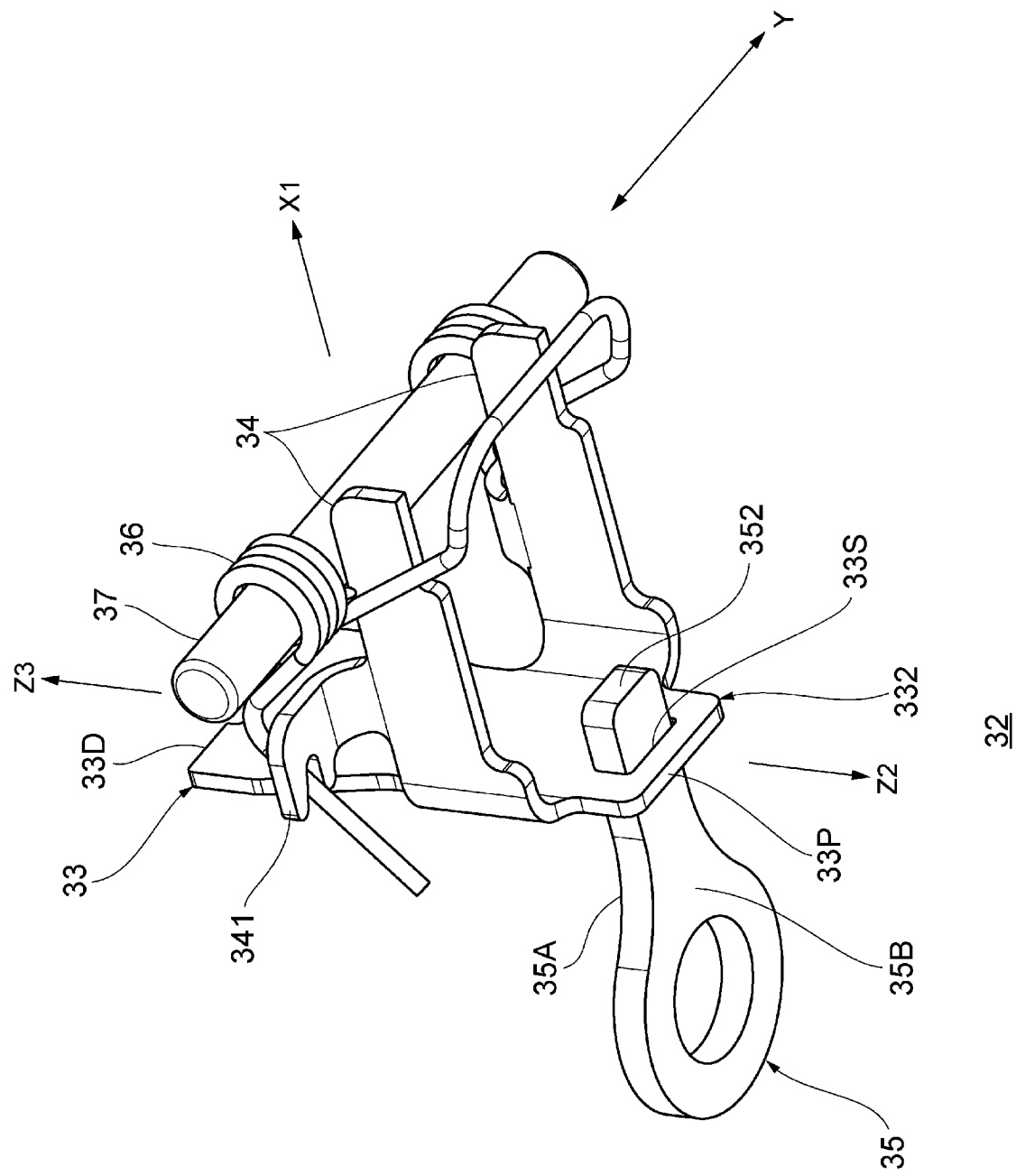
FIG. 16 is a perspective view showing a staple driver according to a fourth embodiment of the present invention.

FIG. 16 is a perspective view showing a staple driver 32 according to a fourth embodiment of the present invention.

The fourth embodiment is different from the third embodiment in shapes of the restricting portion and the restricting structure. In the illustrated example, a slit 33S, which is an example of an opening, is formed in the driving portion 33, and a front end portion (restricting portion) 352 of the washer member 35 is inserted into the slit 33S. Therefore, a movement of the driving portion 33 is restricted by inserting the front end portion 352 of the washer member 35 into the slit 33S of the driving portion 33. A bottomed recess may be formed in the driving portion 33 instead of the slit 33S, and the front end portion 352 of the washer member may be fitted into the recess. According to the fourth embodiment, similarly to the third embodiment, the movement of the driving portion 33 can be restricted and the deformation of the driving portion 33 can be prevented beforehand.

Fifth Embodiment

Figure 17:
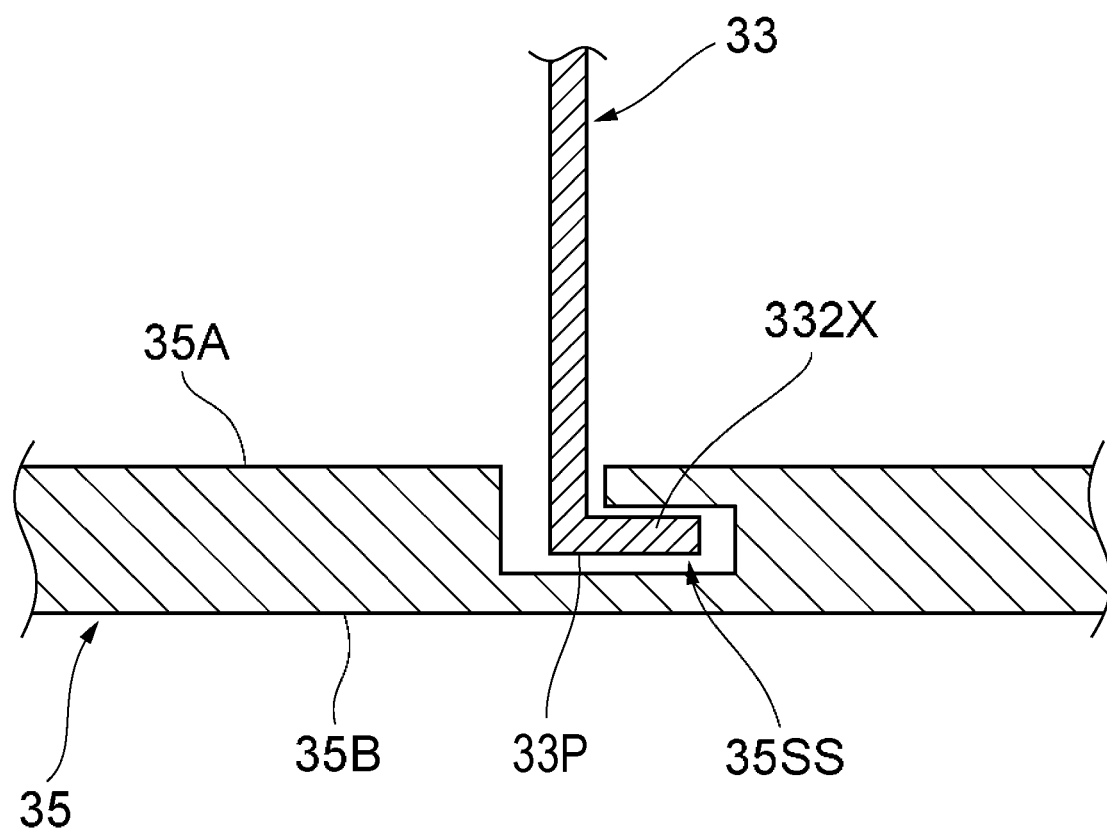
FIG. 17 is a cross-sectional view showing a staple driver according to a fifth embodiment of the present invention.

FIG. 17 is a cross-sectional view showing a staple driver 32 according to a fifth embodiment of the present invention. The fifth embodiment is different from the third and fourth embodiments in shapes of the restricting portion and the restricting structure. In the fifth embodiment, a recess (restricting portion) 35SS is formed as a bent groove (for example, a groove having an L-shaped cross section) in the front surface 35A of the washer member 35, and a restricting structure 332X provided at the base end portion of the driving portion 33 is configured to fit into the recess 35SS.

The restricting structure 332X is formed in a shape that the restricting structure 332X is fitted into the recess 35SS. Specifically, the restricting structure 332X is formed at the base end portion including the base end 33P of the driving portion 33 and the vicinity of the base end 33P, and extends so as to be bent along an extending direction of the washer member 35 from the base end portion of the driving portion 33. That is, the base end portion of the driving portion 33 is formed in an L shape. Such a restricting structure 332X is fitted in the recess 35SS, and thus a movement of the driving portion 33 is restricted. According to the fifth embodiment, similarly to the third and fourth embodiments, the deformation of the driving portion 33 can be prevented beforehand.

The embodiments described above are for facilitating understanding of the present invention and are not to be interpreted as limiting the present invention. The elements included in the embodiments and their arrangements, materials, conditions, shapes, sizes, and the like are not limited to those illustrated, and can be appropriately changed. Further, it is possible to partially replace or combine the configurations shown in different embodiments. For example, although the staple ST is used as a means for binding both ends of a tape loop, the present invention is not limited thereto, and the tape loop may be bound by another means.

According to an aspect of the present invention, a binding machine includes: a main handle configured to accommodate a staple; a staple driver supported by the main handle and configured to drive the staple; and a clincher arm rotatably attached to the main handle and including a clincher, the clincher being configured to clinch the staple driven by the staple driver. The staple driver includes: a driving portion that extends in a direction away from the main handle and is configured to drive the staple toward the clincher, and an attachment portion with which the driving portion is attached to the main handle. The attachment portion extends in a longitudinal direction of the main handle from a side edge of the driving portion.

The staple driver may be displaceably attached to the main handle.

The clincher arm may be rotatable in a closing direction in which an angle between the clincher arm and the main handle reduces and in an opening direction in which the clincher arm opens toward a direction opposite to the closing direction. The staple driver may is configured to drive the staple when the clincher arm is rotated in the closing direction. The staple driver may be displaceably attached to the main handle such that: an end portion of the driving portion disposed on a side near the main handle is located at a first position in a state where the clincher arm is rotated in the closing direction, and the end portion of the driving portion disposed on the side near the main handle is located at a second position that is closer to a front end portion of the main handle than the first position, in a state where the clincher arm is rotated in the opening direction.

The main handle may have a washer member dispose between the main handle and the staple driver and having a front surface on which the staple driver is slidable.

The washer member may have a restricting portion configured to restrict a movement of the staple driver in a direction away from the main handle.

The restricting portion may be a recess into which the staple driver is fitted.

The recess may be provided in the front surface.

The restricting portion may have a penetrating portion that penetrates the front surface and a back surface opposite to the front surface. The driving portion may penetrate the penetrating portion.

The driving portion may have a narrow portion penetrating the penetrating portion, and a wide portion provided at a distal end of the narrow portion and being wider than the narrow portion. At least a part of the wide portion may face the back surface.

The driving portion may have an opening, into which the washer member is able to be fitted, at a position facing the washer member. The restricting portion may restrict a movement of the staple driver in the direction away from the main handle by fitting the washer member into the opening.

The driving portion may have a recess, into which the washer member is able to be fitted, at a position facing the washer member. The restricting portion may restrict a movement of the staple driver in the direction away from the main handle by fitting the washer member into the recess.

The main handle may have a biasing means configured to bias the staple driver in a first direction toward the front end portion of the main handle and in a second direction toward the main handle.

According to the present invention as described above, there is provided a binding machine including a highly durable staple driver that is less likely to be damaged even when being used repeatedly.

What is claimed is:

1. A binding machine, comprising:
a main handle configured to accommodate a staple;
a staple driver supported by the main handle and configured to drive the staple; and
a clincher arm rotatably attached to the main handle and including a clincher, the clincher being configured to clinch the staple driven by the staple driver, wherein
the main handle includes a front end portion in which a tape guide for pulling out the tape is provided,
the staple driver includes:
a driving portion that extends in a direction away from the main handle and is configured to drive the staple toward the clincher, and
an attachment portion with which the driving portion is attached to the main handle, the driving portion is formed in a substantially rectangular plate having a distal end that faces toward the staple, a base end opposite to the distal end, and side edges, and
the attachment portion extends toward the front end portion of the main handle from the side edges of the driving portion.

2. The binding machine according to claim 1, wherein the staple driver is displaceably attached to the main handle.

3. The binding machine according to claim 2, wherein the main handle has a washer member disposed between the main handle and the staple driver and having a top surface on which the staple driver is slidable.

4. The binding machine according to claim 3, wherein the washer member has a restricting portion configured to restrict a movement of the staple driver in a direction away from the main handle.

5. The binding machine according to claim 4, wherein the restricting portion is a recess into which the staple driver is fitted.

6. The binding machine according to claim 5, wherein the recess is provided in the top surface.

7. The binding machine according to claim 4, wherein the restricting portion has a penetrating portion that extends from the top surface to a bottom surface opposite to the top surface, and
the driving portion penetrates the penetrating portion.

8. The binding machine according to claim 7, wherein the driving portion has a narrow portion penetrating the penetrating portion, and a wide portion provided at a distal end of the narrow portion and being wider than the narrow portion, and
at least a part of the wide portion faces the bottom surface.

9. The binding machine according to claim 4, wherein the driving portion has an opening, into which the washer member is able to be fitted, at a position facing the washer member, and
the restricting portion restricts a movement of the staple driver in the direction away from the main handle by fitting the washer member into the opening.

10. The binding machine according to claim 4, wherein the driving portion has a recess, into which the washer member is able to be fitted, at a position facing the washer member, and
the restricting portion restricts a movement of the staple driver in the direction away from the main handle by fitting the washer member into the recess.

11. The binding machine according to claim 1, wherein the clincher arm is rotatable in a closing direction in which an angle between the clincher arm and the main handle reduces and in an opening direction in which the clincher arm opens toward a direction opposite to the closing direction,
the staple driver is configured to drive the staple when the clincher arm is rotated in the closing direction, and
the staple driver is displaceably attached to the main handle such that:
an end portion of the driving portion disposed on a side near the main handle is located at a first position in a state where the clincher arm is rotated in the closing direction, and
the end portion of the driving portion disposed on the side near the main handle is located at a second position that is closer to a front end portion of the main handle than the first position, in a state where the clincher arm is rotated in the opening direction.

12. The binding machine according to claim 11, wherein the main handle has a washer member disposed between the main handle and the staple driver and having a top surface on which the staple driver is slidable.

13. The binding machine according to any one of claim 12, wherein
the washer member has a restricting portion configured to restrict a movement of the staple driver in a direction away from the main handle.

14. The binding machine according to claim 13, wherein the restricting portion is a recess into which the staple driver is fitted.

15. The binding machine according to claim 14, wherein the recess is provided in the top surface.

16. The binding machine according to claim 13, wherein the restricting portion has a penetrating portion that extends from the top surface to a bottom surface opposite to the top surface, and
the driving portion penetrates the penetrating portion.

17. The binding machine according to claim 16, wherein the driving portion has a narrow portion penetrating the penetrating portion, and a wide portion provided at a distal end of the narrow portion and being wider than the narrow portion, and
at least a part of the wide portion faces the bottom surface.

18. The binding machine according to claim 13, wherein
the driving portion has an opening, into which the washer member is able to be fitted, at a position facing the washer member, and
the restricting portion restricts a movement of the staple driver in the direction away from the main handle by fitting the washer member into the opening.

19. The binding machine according to claim 13, wherein
the driving portion has a recess, into which the washer member is able to be fitted, at a position facing the washer member, and
the restricting portion restricts a movement of the staple driver in the direction away from the main handle by fitting the washer member into the recess.

20. The binding machine according to claim 1, wherein
the main handle has a biasing member configured to bias the staple driver in a first direction toward the front end portion of the main handle and in a second direction toward the main handle.

* * * * *